US005664090A

United States Patent [19]
Seki et al.

[11] Patent Number: 5,664,090
[45] Date of Patent: Sep. 2, 1997

[54] PROCESSOR SYSTEM AND METHOD FOR MAINTAINING INTERNAL STATE CONSISTENCY BETWEEN ACTIVE AND STAND-BY MODULES

[75] Inventors: Toshibumi Seki; Yasukuni Okataku, both of Tokyo, Japan

[73] Assignee: Kabushiki Kaisha Toshiba, Kanagawa-ken, Japan

[21] Appl. No.: 670,718

[22] Filed: Jun. 21, 1996

Related U.S. Application Data

[63] Continuation of Ser. No. 356,065, Dec. 14, 1994, abandoned.

[30] Foreign Application Priority Data

Dec. 15, 1993 [JP] Japan ................................ 5-313903

[51] Int. Cl.$^6$ .................................................. G06F 11/00
[52] U.S. Cl. ................................ 395/182.13; 395/182.11
[58] Field of Search ........................ 395/182.09, 185.08, 395/182.13, 182.11, 182.08, 182.19; 371/62

[56] References Cited

U.S. PATENT DOCUMENTS

| | | | |
|---|---|---|---|
| 4,610,013 | 10/1986 | Long et al. | 371/9 |
| 5,155,846 | 10/1992 | Mino | 395/575 |
| 5,185,693 | 2/1993 | Loftis et al. | 364/187 |
| 5,255,367 | 10/1993 | Bruckert et al. | 395/200 |
| 5,423,024 | 6/1995 | Cheung | 395/575 |
| 5,491,787 | 2/1996 | Hashemi | 395/182.09 |

FOREIGN PATENT DOCUMENTS

| | | |
|---|---|---|
| 4-111648 | 4/1992 | Japan. |
| 4-281535 | 10/1992 | Japan. |

*Primary Examiner*—Robert W. Beausoliel, Jr.
*Assistant Examiner*—Norman M. Wright
*Attorney, Agent, or Firm*—Finnegan, Henderson, Farabow, Garrett & Dunner, L.L.P.

[57] ABSTRACT

A stand-by system replicates a program module to an active object and a passive object. During execution of operations of the active object, when the active object fails, operations continue to be executed in the passive object. There is provided a checkpoint period memory for storing a checkpoint period, a detecting unit for detecting whether an internal state of the active object has been changed according to the checkpoint period, a consistency maintaining unit for maintaining consistency of the internal state between the active object and the passive object when the internal state has been changed, and a checkpoint period changing unit for increasing the checkpoint period when the internal state has not been changed.

32 Claims, 12 Drawing Sheets

PROCESSOR SYSTEM AND METHOD FOR MAINTAINING INTERNAL STATE CONSISTENCY BETWEEN ACTIVE AND STAND-BY MODULES

This application is a continuation of application Ser. No. 08/356,065, filed Dec. 14, 1994, now abandoned.

BACKGROUND OF THE INVENTION

1. Field of the Invention

The present invention relates to a stand-by system based on a process module replication.

2. Description of the Related Art

In parallel/distributed systems, there is a stand-by system based on program modules replication as means to improve reliability of a computer system. This stand-by system is defined as follows. One of replicated program modules that is given an execution privilege, executes its operation. When the privileged program module fails, one of remaining other program modules in the replicated program modules takes over its operation by being given the execution privilege. Consequently the program module given the execution privilege continues executing its operation. In this situation, an active object is defined as a program module having an execution privilege and a passive object is defined as a program module not having an execution privilege. The active object usually executes its operation. When the active object fails, one of the passive objects is switched to be a new active object, and the new active object takes over the operation.

In such a stand-by system, because the passive object does not carry out its operation until the active object fails, low load processing and high resource utilization are achieved. However, the stand-by system must guarantee to maintain consistency of its internal state, e.g., its memory and register values, between the active object and the passive object.

Therefore, in conventional stand-by systems, it is known that either a programmer consciously writes checkpoints in a program in order to guarantee to maintain the consistency of the internal state between the active object and the passive object, or the stand-by system periodically copies the internal state from the active object to the passive object according to a predefined interval period.

However, in the former way, when a programmer consciously writes checkpoints in programs,—and then modifies the programs, the programmer must change the checkpoint position in consideration of the program structure. Therefore, the amount of work for the programmer increases. In the latter way, when checkpoints are defined at predefined intervals,—the programmer does not need to consciously define the checkpoints, the system may not be efficient, because the active object copies its internal state periodically even if there is no change in the internal state of the active object.

SUMMARY OF THE INVENTION

In accordance with the present invention, there is provided a stand-by system including a program module replicated to at least to program (process) modules, wherein one of the program modules is a privileged module execution privilege, the execution privilege being transferred to another one of the program modules upon occurrence of a program fault in the privileged module, the stand-by system comprising: a checkpoint period memory for storing a checkpoint period representing an interval value; checking means for checking whether an internal state of the privileged program module has been changed according to the checkpoint period and for providing a checking result; checkpoint period changing means for changing the checkpoint period stored in said checkpoint period memory based on the checking result; and consistency maintaining means for maintaining consistency of the internal state between the privileged program module and another one of the program modules based on the checking result.

Further in accordance with the present invention, there is provided a method for changing a checkpoint period in a stand-by system, the stand-by system including a program module replicated to at least two program modules, wherein one of the program modules is a privileged module having an execution privilege, the execution privilege being transferred to a non-privileged one of the program modules upon occurrence of a program fault in the privileged module, the method comprising the steps of: sending an inquiry request message from the non-privileged one of program modules to the privileged program module according to the checkpoint period, the checkpoint period representing an interval value, the inquiry request message inquiring whether the internal state of the privileged program module has been changed; checking whether the internal state of the privileged program module has been changed according to an inquiry request message sent from the non-privileged one of program modules; replying a decision result detected in said checking step to the non-privileged one of program modules; changing the checkpoint period upon the decision result sent in said replying step not including an internal state; and changing an internal state of the non-privileged one of program modules when the result sent in said replying step includes an internal state of the privileged program module.

BRIEF DESCRIPTION OF THE DRAWINGS

The accompanying drawings, which are incorporated in and constitute a part of the specification, illustrate presently preferred embodiments of a detailed description of the invention, and together with the general description given above and the detailed description of the preferred embodiments given below, serve to explain the principles of the invention.

DETAILED DESCRIPTION OF THE PREFERRED EMBODIMENTS

Figure 1:
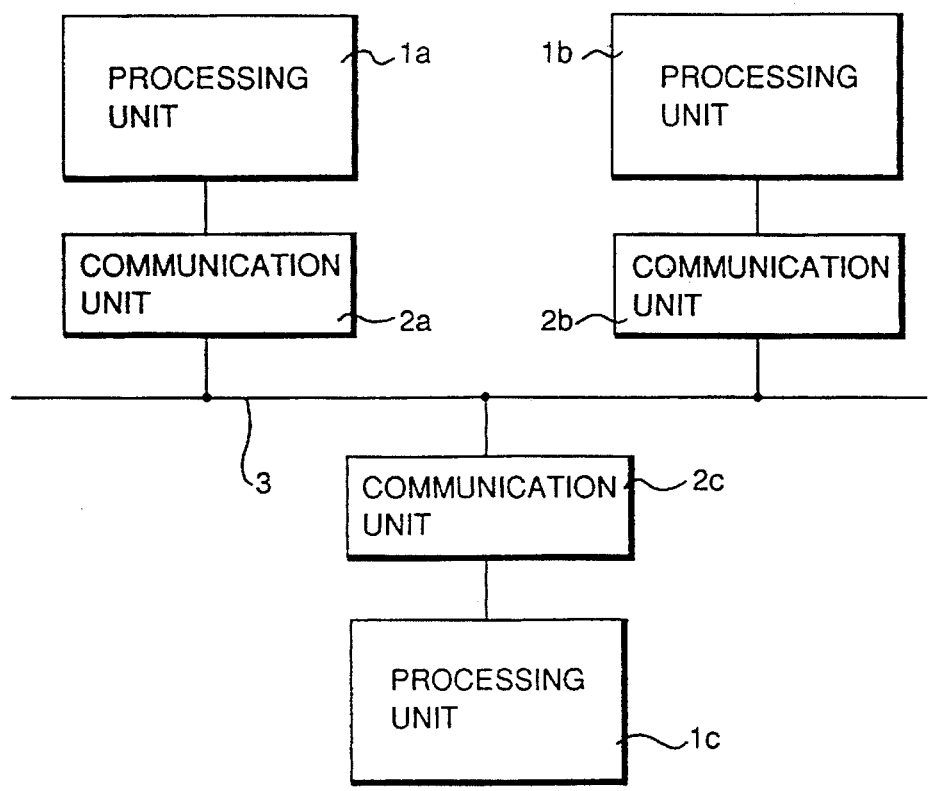
FIGS. 1A and 1B are block diagrams showing a configuration of a stand-by system.
Figure 1:
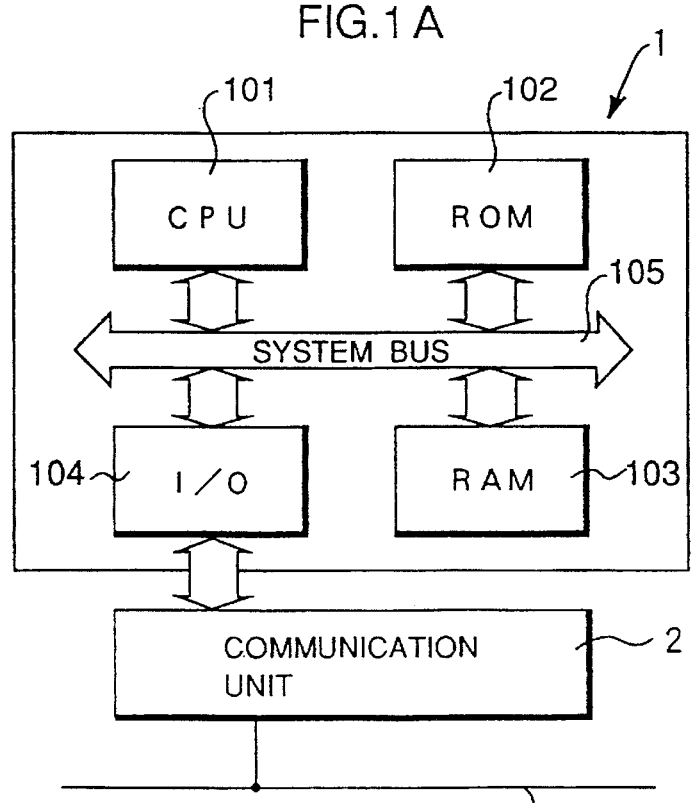

Embodiments of the present invention will be described below with reference to the accompanying drawings, in which the same reference numerals denote the same parts throughout the accompanying drawings.

FIGS. 1A and 1B show the configuration of a stand-by system. The illustrated stand-by system comprises several processing units. In FIG. 1A, each of processing units 1a, 1b, 1c comprises several program (process) modules. The program modules carry out their operation an each of the processing units 1a, 1b, 1c. Each of the processing units 1a, 1b, 1c is connected to other processing units by a communication line 3, e.g., a local area network and a bus connection, through communication units 2a, 2b, 2c, respectively. Each of the communication units 2a, 2b, 2c controls communication between the program modules.

FIG. 1B schematically shows the structure of the processing unit 1, for example. The processing unit 1 comprises a CPU (Central Processing Unit) 101, a ROM (Read Only Memory) 102, a RAM (Random Access Memory) 103 and an I/O unit (Input/Output unit) 104, and a system bus 105 for enabling communication between them.

Figure 2:
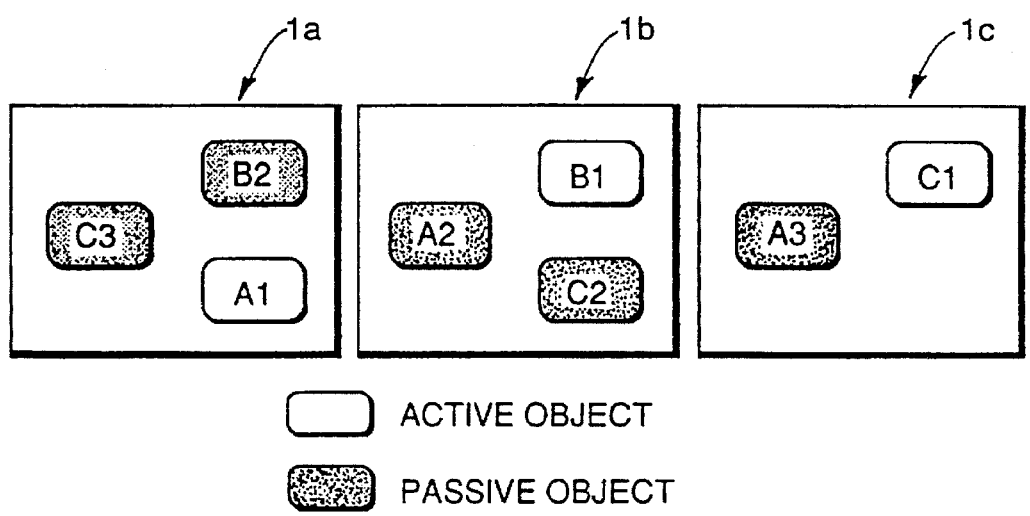
FIG. 2 is a diagram illustrating a concept of replicated process modules.

In accordance with embodiments of the present invention, each of the program modules is replicated and is distributed to other processing units. In other words, the replicated program modules will produce the same results if they receive the same messages in the same order. FIG. 2 is a diagram illustrating the concept of the replicated program modules.

In FIG. 2, a program module A is copied and the copies are registered to the processing units 1a, 1b, 1c. For example, A1, A2, A3 are defined as the copies of the program module A. Only the program module A1 is given an execution privilege among the program modules A1, A2, A3 registered in the processing units 1a, 1b, 1c, respectively. The remaining program modules A2 and A3 are not given an execution privilege. That is, the program module A1 is an active object which operates in a normal situation, and the remaining program modules A2 and A3 are passive objects which are in a stand-by state in the normal situation and are available to take over the operation of its corresponding active object in case the active object fails.

Similarly, a program module B is registered in the processing units 1a, 1b as program modules B2, B1, respectively. The program module B1 in the processing unit 1b is an active object given an execution privilege, and the program module B2 in the processing unit 1a is a passive object not given an execution privilege. Also, a program module C is registered on the processing units 1a, 1b, 1c as program modules C3, C2, C1, respectively. The program module C1 in the processing unit 1c is an active object given an execution privilege, and the remaining program modules C3, C2 are passive object not given an execution privilege.

As stated above, when the active object fails, one of the stand-by passive objects is changed to a new active object. When more than two passive objects exist, only one of the passive objects is changed to a new active object when an executing active object fails.

The above mentioned system is called a stand-by system based on program modules replication. That is, a program module is replicated into an active object given an execution privilege and one or more passive objects not given an execution privilege. Although each active object executes its operation in a normal situation, when the active object fails, one of the remaining passive objects is changed to a new active object, and the new active object continues to execute its operation.

The stand-by system must guarantee to maintain the consistency of the internal state between the active object and the corresponding passive object. Therefore, it is necessary to perform functions to achieve this consistency. In this case according to embodiments of the present invention, the stand-by system uses points in time at which to detect whether or not a program module has to send its own internal state. This point in time is called a checkpoint and an interval from a checkpoint to the next checkpoint is called a checkpoint period.

The following two types of functions exist to maintain the consistency of the internal states of the active object and the passive object. In one type, the stand-by system sends the internal state of the active object to the corresponding passive object by managing the checkpoint period in the active object, thereby constituting an active object oriented system and method. In the other type, the passive object sends an inquiry request message to the corresponding active object by managing the checkpoint period in the passive object, and the active object sends the internal state to the corresponding passive object according to the inquiry request, thereby constituting a passive object oriented system and method.

Figure 3A:
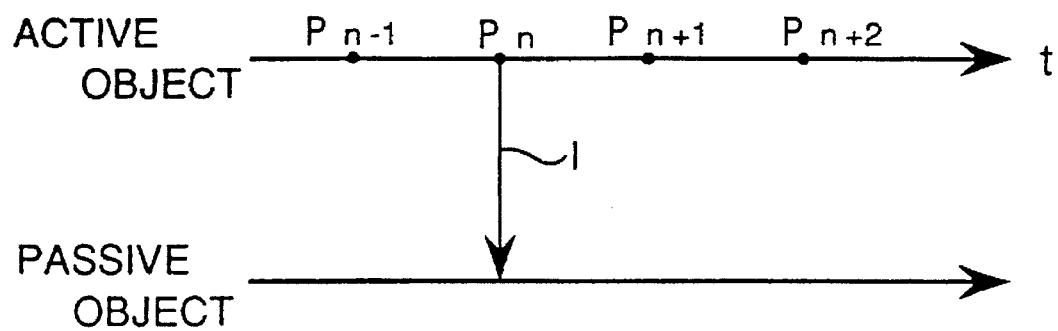
FIGS. 3A and 3B are diagrams illustrating a concept of checkpoints.
Figure 3B:
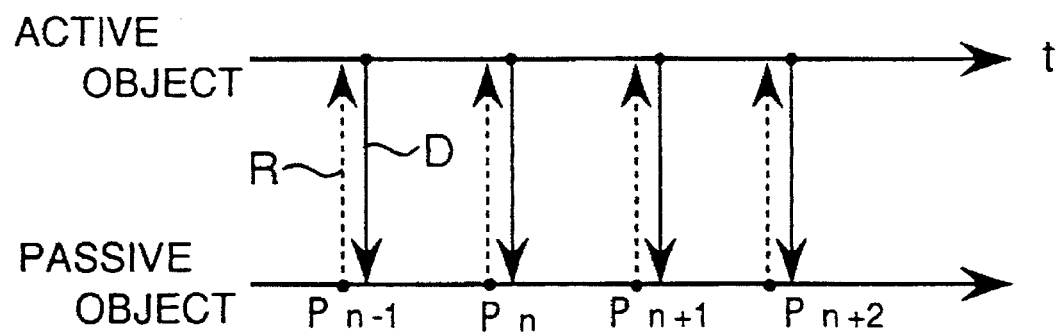

FIGS. 3A and 3B are diagrams illustrating the concept of checkpoints. FIG. 3A is a time chart for executing a program module under the active object oriented method, and FIG. 3B is a time chart for executing a program module under the passive object oriented method.

As shown in FIG. 3A, at each time Pn−1, Pn, . . . , managed by an active object, the active object checks whether or not the internal state has been changed. Each time is called a checkpoint, e.g., the time 'Pn' is called checkpoint 'Pn'. When the active object detects that the internal state has been changed, the active object sends the internal state to a passive object. For example, FIG. 3A shows that internal state 'I' is sent from the active object to the passive object, because the internal state at the timing of checkpoint 'Pn' was changed.

As shown in FIG. 3B, at each checkpoint Pn−1, Pn, . . . , managed by a passive object, the passive object inquires of the active object by sending an inquiry request message 'R' represented by a broken line about whether or not the internal state has changed. The active object replies with a decision result message 'D' to the passive object after checking its own internal state change. When the passive object detects that the received decision result message includes the internal state of the active object, the passive object updates its own internal state to the received internal state. For example, FIG. 3B shows that the active object replies with the decision result 'D' message to the passive object in response to the inquiry request message 'R' represented by a broken line sent from the passive object. Also at this time, the active object may unconditionally send its internal state, and then the passive object may detect whether or not the received internal state has been changed.

Figure 4A:
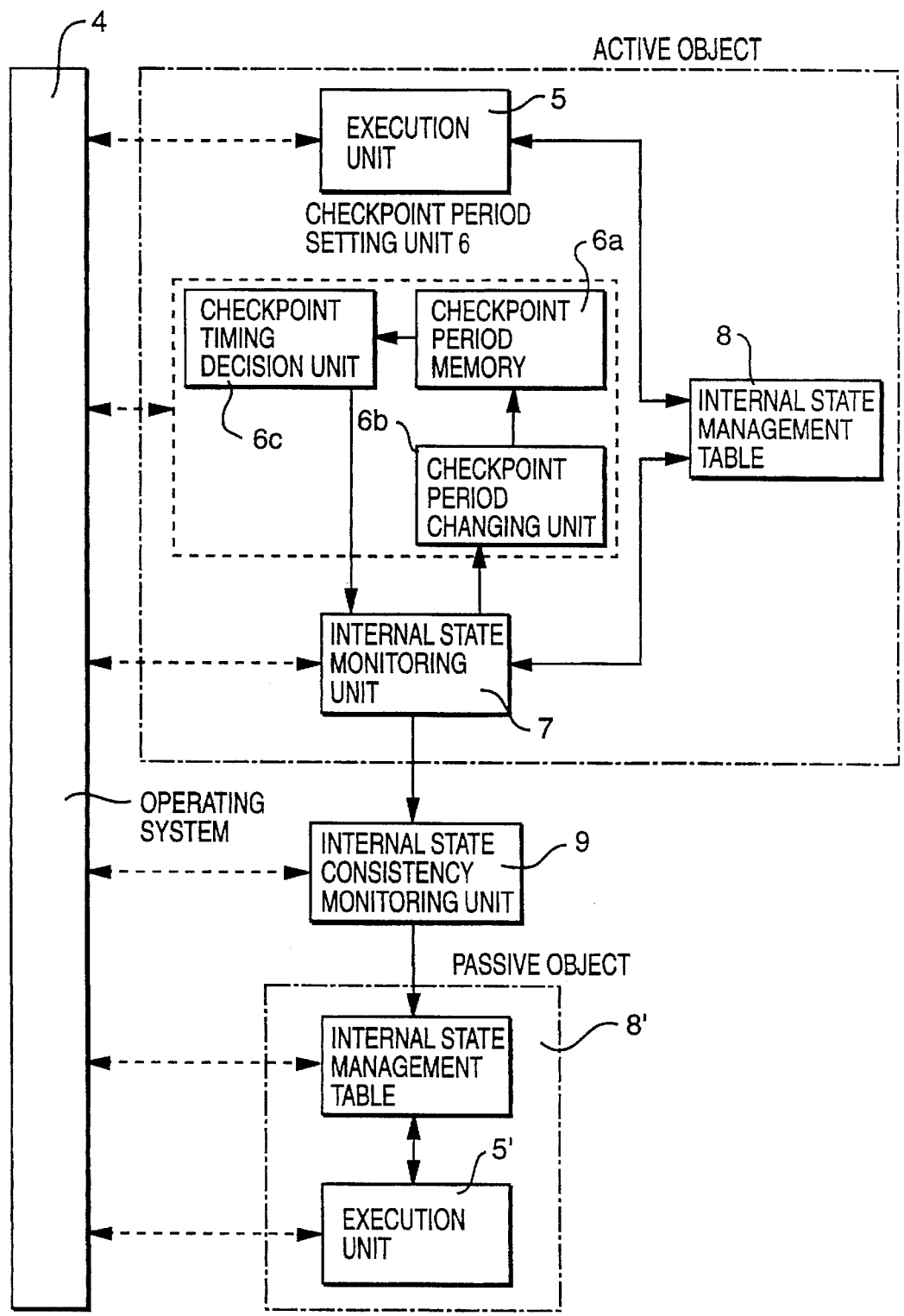
FIGS. 4A and 4B are block diagrams showing a stand-by system according to a first embodiment of the present invention.

FIG. 4A shows the stand-by system of a first embodiment of the invention, with a mechanism to change dynamically the checkpoint period. In the first embodiment, the stand-by system type is the active object oriented method, i.e., the function to manage the checkpoint period exists in the active object.

As shown in FIG. 4A, an operating system 4 controls the execution of program modules and communication among the processing units 1a, 1b, 1c (FIG. 1). An execution unit 5 carries out the inherent operation related to its own program module under the control of the operating system 4.

A checkpoint period setting unit 6 comprises a checkpoint period memory 6a, a checkpoint period changing unit 6b and a checkpoint timing decision unit 6c. The checkpoint period memory 6a stores a checkpoint period as representing the interval time between the checkpoints. The checkpoint period changing unit 6b controls the checkpoint period stored in the checkpoint period memory 6a by setting the current value to a predetermined value or changing the current value by a predetermined method. The checkpoint timing decision unit 6c counts time by a built-in clock function and checks whether the elapsed time exceeds the checkpoint period stored in the checkpoint period memory 6a. When the elapsed time equals the checkpoint period, the checkpoint timing decision unit 6c activates an interval state monitoring unit 7.

The operating system 4 activates the checkpoint period setting unit 6 before it activates the execution unit 5 in which the program modules execute. In this case of the first embodiment, when the stand-by system comprises active objects, the operating system 4 activates the checkpoint period setting unit 6 after the active object has been registered into the processing unit 1.

Figure 4B:
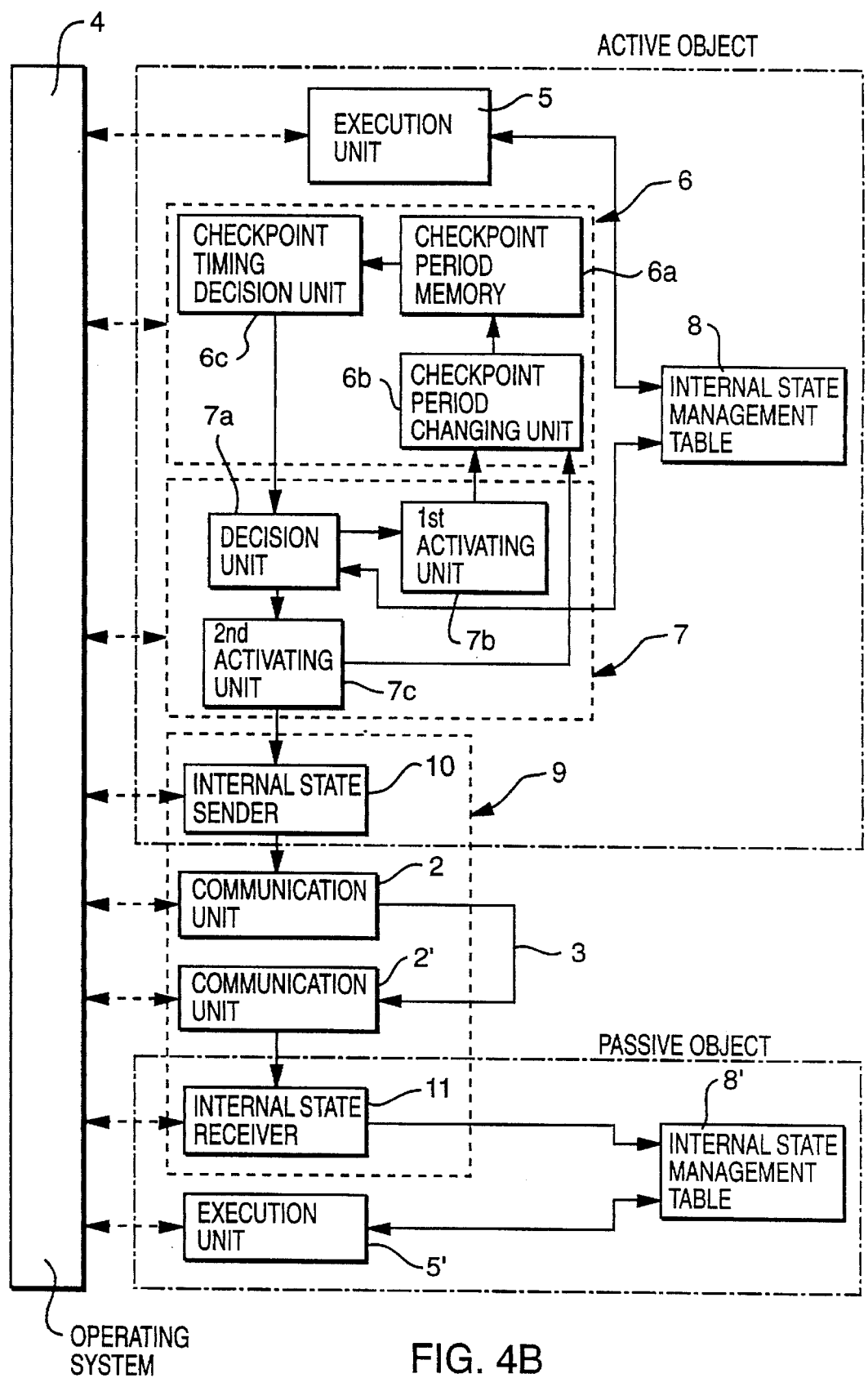
Figure 5A:
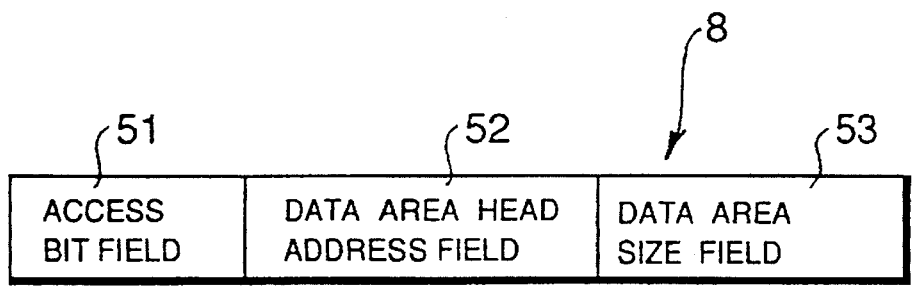
FIGS. 5A and 5B are diagrams of an internal state management table.
Figure 5B:
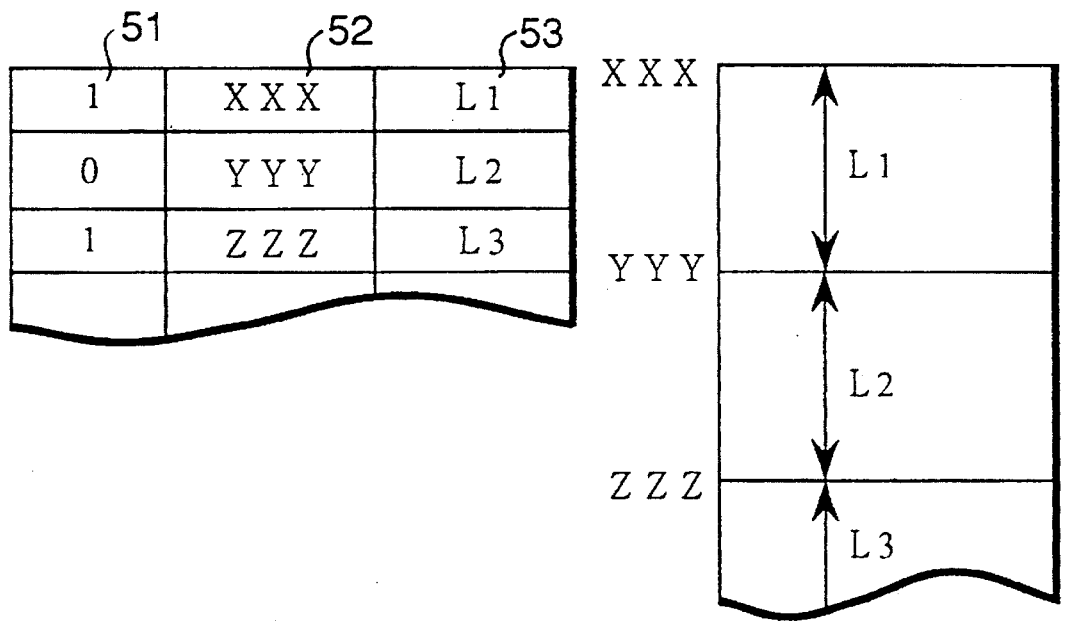

FIG. 4B illustrates further details of the stand-by system of the first embodiment. With reference also to FIG. 4B, the internal state monitoring unit 7 comprises an internal state decision unit 7a, a first activating unit 7b, and a second activating unit 7c. The internal state decision unit 7a checks whether the internal state of the program module has been changed. That is, the internal state decision unit 7a is activated by the checkpoint timing decision unit 6c under the operating system 4, when the time counted by the checkpoint timing decision unit 6c has exceeded the checkpoint period. Then the internal state decision unit 7a checks whether the internal state of the active object has been changed during an interval from the last checkpoint to the present checkpoint. With reference to FIG. 5A, the internal state decision unit 7a refers to an internal state management table 8 in order to check whether or not the internal state has been changed. As shown in FIG. 5A, the internal state management table 8 comprises three fields, i.e., an access bit field 51, a data area head address field 52, and a data area size field 53. As shown in FIG. 5B, the data area head address field 52 stores the head address of a data area having a size listed in the data area size field 53. The access bit field 51 stores a bit that is changed to '1' when the data area pointed to by the data area head address field 52 is accessed. When the internal state decision unit 7a detects that the internal state has been changed, the access bit field 51 is reset, i.e., to '0'.

In addition, various modifications may be made without departing from the spirit or scope of the general inventive concept as defined by the appended claims and their equivalents. For example, the scope of the invention includes that method upon determining whether the execution unit 5 has been activated since the last checkpoint.

When the internal state decision unit 7a detects that the internal state of the program module has not been changed at the present checkpoint, it informs the first activating unit 7b. The first activating unit 7b activates the checkpoint period changing unit 6b in order to increase the checkpoint period stored in the checkpoint period memory 6a. The checkpoint period changing unit 6b receives the message, and changes the present checkpoint period stored in the checkpoint period memory 6a according to a predetermined method. For example, the predetermined method can be defined to increase the present checkpoint period by a predetermined multiple, or by adding a predetermined value to the present checkpoint period.

Further, in the first embodiment, when the internal state decision unit 7a detects that the internal state of the program module has been changed at the present checkpoint, it informs to both the first activating unit 7b and the second activating unit 7c. The first activating unit 7b activates the checkpoint period changing unit 6b in order to reset the present checkpoint period to an initial value. At the same time, the second activating 7c activates an internal state consistency maintaining unit 9.

The internal state consistency maintaining unit 9 is activated through the operating system 4 to change the content of the internal state for the passive object to the content of the corresponding internal state for the active object. In other words, the internal state consistency maintaining unit 9 updates the data area managed by an internal state management table 8' in the passive object according to the received message sent from the internal state monitoring unit 7, and also updates register information.

In the first embodiment, the internal state is defined to comprise the state of registers in the execution unit 5 and its own data area managed by the internal state management table 8.

According to the above description, the stand-by system can guarantee to maintain the consistency of the internal state between the active object and the passive object. Since, the address of the data area accessed by the program module is identified in the internal state management table 8, it can be easily accessed. In addition, because the register information for the executing unit 5 is controlled by the operating system 4, it can be easily accessed and changed, by using a system call prepared in the operating system 4.

Although, in FIGS. 4A and 4B, both the active object and the passive object are under control of one operating system 4, they may be under control of separate operating systems.

The following is a more detailed description of the internal state consistency maintaining unit 9 in the first embodiment of the present invention.

An internal state sender 10 is activated by operating system 4 when it receives the message that has been sent from the internal state monitoring unit 7, and the internal state sender 10 sends the received message to an internal state receiver 11 in the passive object through corresponding communication units 2 and 2', and the communication line 3. Such communication of the internal state may be realized by a communication mechanism supported by the operating system 4, e.g., a message passing, or my be realized by a communication mechanism separated from the operating system 4. The internal state receiver 11 in the passive object receiving the internal state updates the data area of the execution unit 5' by referring to the internal state management table 8' according to the received content of the internal state and also changes the register information for the execution unit 5'.

According to the above, the stand-by system can guarantee the consistency of the internal state between the active object and the passive object.

The stand-by system constructed as discussed above is operated as follows.

Figure 6A:
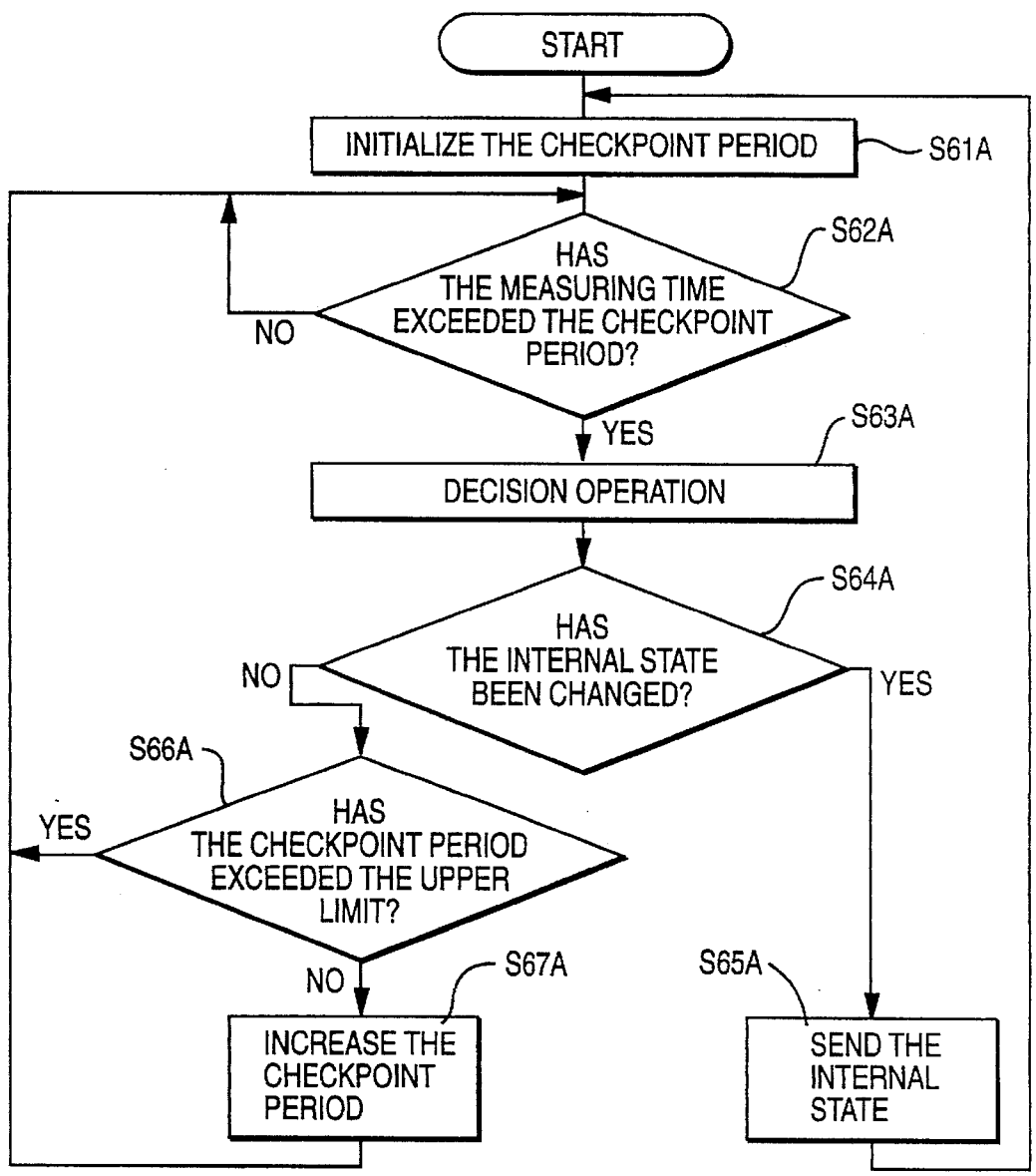
FIGS. 6A and 6B are flow diagrams for illustrating operations of the stand-by system of FIGS. 4A and 4B.
Figure 6B:
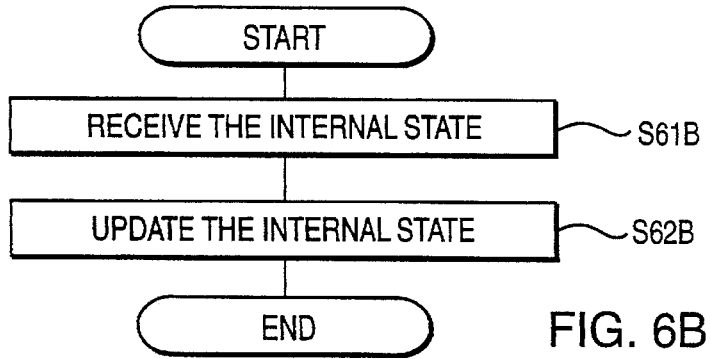

FIGS. 6A and 6B are flow diagrams for illustrating the operation of the stand-by system of FIG. 4. FIG. 6A shows a flow diagram for illustrating the operation at the active object, and FIG. 6B shows a flow diagram for illustrating the operation at the passive object.

First, when the operating system 4 registers a program module into the processing unit 1, it sets a given initial value as the checkpoint period to the checkpoint period setting unit 6 (STEP 61A). For example, the checkpoint period setting unit 6 is given 10 ms as an initial value. While the program module is executed, the checkpoint period setting unit 6 activates the internal state monitoring unit 7 at every checkpoint timing (STEP 62A), at which time the activated internal state monitoring unit 7 checks whether the internal state of the program module has been changed (STEP 63A). In the first embodiment, the internal state monitoring unit 7 monitors an alternation of the access bit field 51 in the internal state management table 8 (STEP 64A).

When the internal state monitoring unit 7 detects an alternation of the internal state, i.e., the access bit field 51 has been changed to '1', it activates the internal state sender 10. Then the internal state sender 10 sends its own internal state to the internal state receiver 11 of the corresponding passive object (STEP 65A). In the passive object, the internal state receiver 11 receives the internal state (STEP 61B), and updates its own internal state according to the content of the received the internal state (STEP 62B). The process returns to STEP 61A after the active object sends the internal state, the checkpoint period is reset to the initial checkpoint period, and the above flow is repeated.

Conversely, when the internal state monitoring unit 7 determines there is no change of the internal state, i.e., the access bit field 51 is '0', it checks whether the checkpoint period has not exceeded an upper limit (STEP 66A). When the checkpoint period has not exceeded the upper limit, it activates the checkpoint period setting unit 6 to increase the checkpoint period (STEP 67A). In the first embodiment, the checkpoint period setting unit 6 increases the present checkpoint period by a predetermined multiple, e.g., if the present checkpoint period is 10 ms, then the new checkpoint period will be 12 ms so that it increases the present checkpoint period by 1.2 times. After the checkpoint period setting unit 6 changes the present checkpoint period, the process proceeds to STEP 62A to repeat the process as discussed above. When the checkpoint period has exceeded the upper limit, it does not change the checkpoint period, and the process proceeds to STEP 62A to repeat the process as discussed above.

With the repetition of the operation as described above, for example, considering the program module A, the active object A1 sets the checkpoint period, and checks whether its own internal state has been changed at every checkpoint. When its internal state has been changed, the active object A1 broadcasts its own internal state to the passive objects A2, A3. The passive objects A2, A3 will update their own internal state according to the received internal state.

According to the first embodiment, when the execution unit 5 in a program module does not execute and its own internal state has not been changed, the checkpoint period setting unit 6 changes the checkpoint period to be longer. Then the stand-by system can decrease the frequency of checkpoints for maintaining the consistency of the internal state between the active object and the passive object(s). Therefore, the stand-by system can reduce the extra overhead for maintaining the consistency of internal state between the active object and the passive object (s). Consequently, the other program modules registered in the same processing unit can have greater execution time in the CPU.

It is next considered that the execution unit 5 does not execute, so that the checkpoint period setting unit 6 increases the checkpoint period to be longer. If the execution unit 5 restarts so that the internal state is changed, the checkpoint period setting unit 6 resets the present checkpoint period to the initial value. Consequently, the time for rollforward operation to take over the active object operation in case of its failure will not be undesirably long.

Also, when the execution unit 5 does not execute for a very long time, the checkpoint period setting unit 6 may hold a long checkpoint period. In this case, when the active object restarts and fails just before the next checkpoint timing, the rollforward operation may be too long. To meet this contingency, the stand-by system can have an upper limit of the checkpoint period to avoid an excessively long rollforward operation.

As discussed above, upon detecting that the internal state has not been changed, the stand-by system increases the checkpoint period. Conversely, upon detecting that the internal state has been changed, the stand-by system resets the checkpoint period to the initial value. However, the invention in its broader aspects is not limited to the specific details. It is possible to be realized by various modifications. The following is a modification of how to change the checkpoint period.

Figure 7:
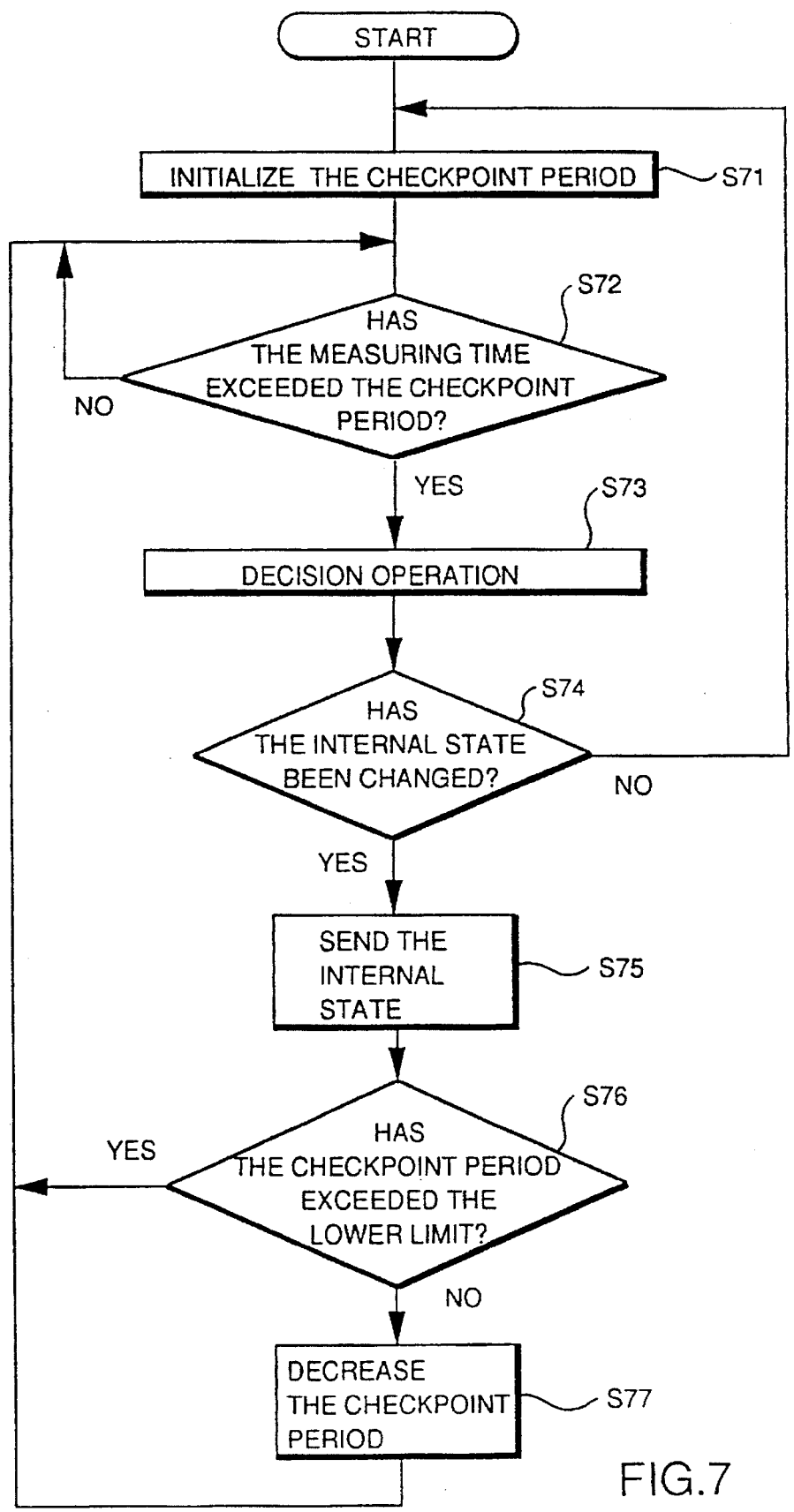
FIG. 7 is a flow diagram for illustrating an operation of the stand-by system of FIGS. 4A and 4B.

For example, in accordance with a first variation, detecting the internal state has been changed, the stand-by system decreases the checkpoint period. Conversely, detecting the internal state has not been changed, the stand-by system resets the present checkpoint to its predetermined initial value. FIG. 7 shows a flow diagram for illustrating first this variation of the operation of the stand-by system. In FIG. 7, the process of STEPs 71–73 is the same as described above for STEPs 61–63.

At step 74, when the internal state monitoring unit 7 detects that the internal state has been changed, i.e., the access bit field 51 has been changed to '1', it activates the internal state sender 10. Then the internal state sender 10 sends its own internal state to the internal state receiver 11 of the corresponding passive object (STEP 75).

In the passive object, the internal state receiver 11 receives the internal state, and updates its own internal state according to the content of the received state. In the active object, after sending the internal state, the internal state monitoring unit 7 checks whether the checkpoint period has exceeded a lower limit (STEP 76). When the checkpoint period has not exceeded the upper limit, it activates the checkpoint setting unit 6 to decrease the checkpoint period (STEP 77). In this case, the checkpoint period setting unit 6 decreases the checkpoint period by a predetermined multiplier, e.g., if the present checkpoint period is 10 ms, then the new checkpoint period will be 8 ms so that it decreases the present period by 0.8 times. After changing the checkpoint period, the process proceeds to STEP 72 to repeat the process as discussed above. When the checkpoint period has exceeded the lower limit, it does not decrease the checkpoint period further, and the process proceeds to STEP 72 to repeat the process as discussed above.

Conversely, at STEP 74 when the internal state monitoring unit 7 detects no alternation of the internal state, i.e., the access bit field 51 is '0', the process proceeds to STEP 71 to reset the checkpoint period to the initial value, and the process repeats as discussed above.

According to this first variation of the first embodiment, when the execution unit 5 executes, the checkpoint period setting unit 6 decreases the checkpoint period. If the execution unit 5 does not change the internal state, the checkpoint period setting unit 6 resets the present checkpoint period to the initial value. Consequently, the time for rollforward operation to take over the active object operation in case of its failure would not be undesirably long.

If after the checkpoint period is shortened upon executing, the execution unit 5 is idle for a long time, it is unnecessary to check the internal state since the active object does not execute and the internal state is not updated. However, when the internal state has not been changed, the checkpoint period resets to the initial value. Consequently, the stand-by system increases the length of the checkpoint period despite the unchanging internal state.

When the execution unit 5 executes for a very long time, the checkpoint period setting unit 6 may hold a short checkpoint period. In this case, the active object does not execute its own inherent operation. To meet this contingency, the stand-by system can have a lower limit of the checkpoint period.

Next, a second variation of the first embodiment with respect to how to change the checkpoint period is discussed. In accordance with the second variation, upon detecting the internal state has been changed, the stand-by system decreases the present checkpoint period. Conversely, upon detecting the internal state has not been changed, the stand-by system increases the present checkpoint period.

Figure 8:
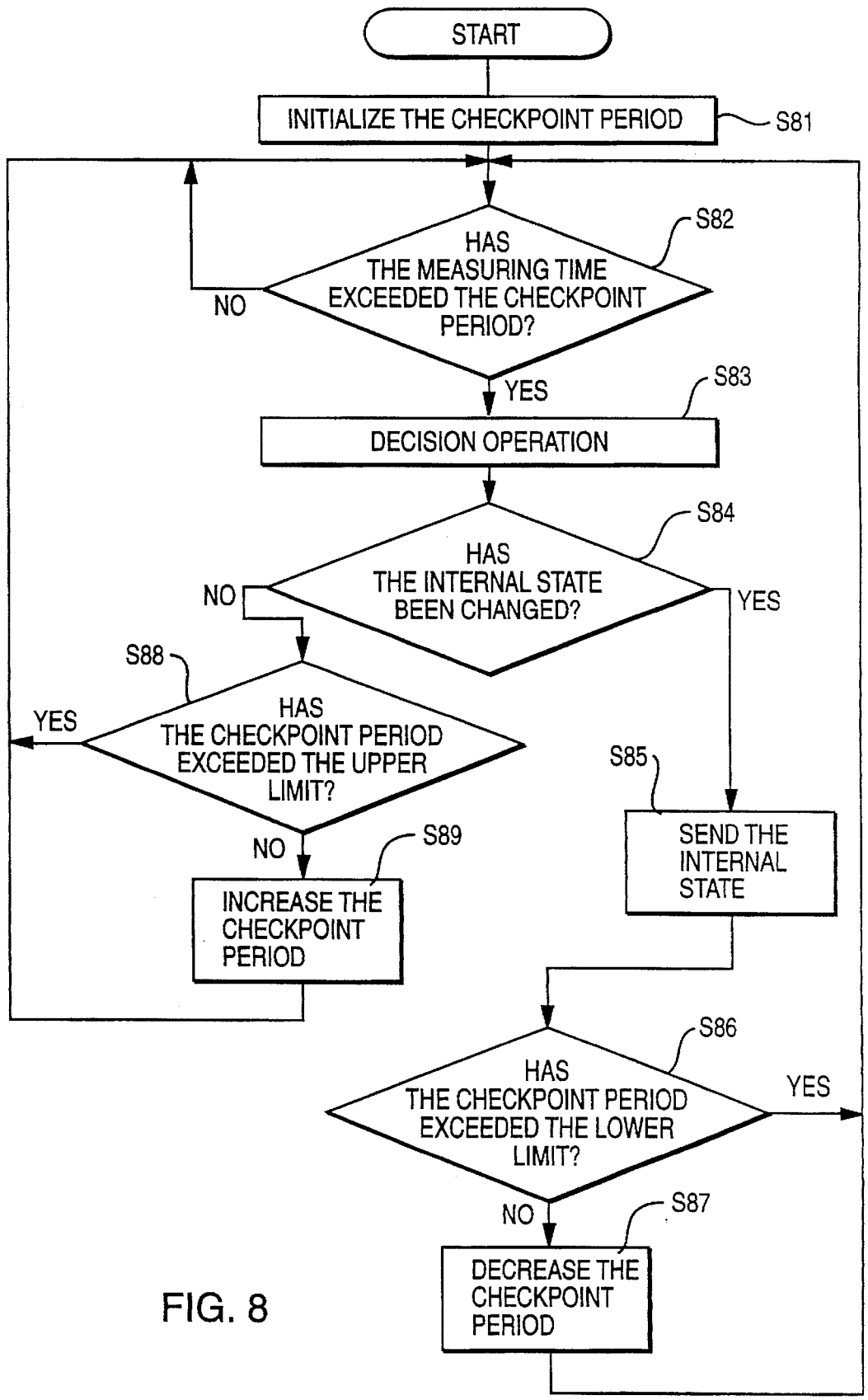
FIG. 8 is a flow diagram for illustrating an operation of the stand-by system of FIGS. 4A and 4B.

FIG. 8 is a flow diagram for illustrating the operation of the stand-by system of the second variation. In FIG. 8, the process of STEPs 81–83 is the same as described above for STEPs 61–63.

At STEP 84, when the internal state monitoring unit 7 detects that the internal state has been changed, i.e., the access bit field 51 has been changed to '1', it activates the internal state sender 10. Then the internal state sender 10 sends its own internal state to the internal state receiver 11 of the corresponding passive object (STEP 85).

In the passive object, the internal state receiver 11 receives the internal state, and updates its own internal state according to the content of the received internal state. In the active object, after sending the internal state, the internal state monitoring unit 7 checks whether or not the checkpoint period has exceeded a lower limit (STEP 86). When the checkpoint period has not exceeded the lower limit, it activates the checkpoint setting unit 6 to decrease the present checkpoint period (STEP 87). In this case, the checkpoint period setting unit 6 decreases the checkpoint period by a predetermined multiple, e.g., if the present checkpoint period is 10 ms, then the new checkpoint period will be 8 ms so that it decreases the present checkpoint period by 0.8 times. After changing the checkpoint period, the process proceeds to STEP 82 to repeat the process as discussed above.

Conversely, at STEP 84 when the internal state monitoring unit 7 determines there is no change of the internal state, i.e., the access bit field 51 is '0', the internal state monitoring unit 7 checks whether or not the checkpoint period has exceeded an upper limit (STEP 88). When the checkpoint period has not exceeded the upper limit, it activates the checkpoint period setting unit 6 to increase the present checkpoint period(STEP 89). In the first embodiment, the checkpoint period setting unit 6 increases the present checkpoint period by a predetermined multiple, e.g., if the present checkpoint period is 10 ms, then the new checkpoint period will be 12 ms so that it increases the present checkpoint period by 1.2 times. After the checkpoint period setting unit 6 changes the present checkpoint period, the process proceeds to STEP 82 to repeat the process as discussed above. When the checkpoint period exceeded the upper limit, nochange is made, and the process proceeds to STEP 82 to repeat the process as discussed above.

According to the above discussion, when the execution unit 5 in a program module does not execute and its own internal state has not been changed, the checkpoint period setting unit 6 changes the checkpoint period to be longer. Then the stand-by system can decrease the frequency of checkpoints for maintaining the consistency of the internal state between the active object and the passive object(s). Therefore, the stand-by system can reduce the extra overhead for maintaining the consistency of internal state between the active object and the passive object(s). Consequently, the other program modules registered in the same processing unit can have greater execution time in the CPU.

Conversely, when the internal state has been changed, the checkpoint period setting unit 6 changes the checkpoint period to be shorter.

Then the stand-by system can optimize setting the checkpoint period, because the checkpoint period setting unit 6 makes the checkpoint period change according to activating the execution unit 5.

In summary, the first embodiment as described above includes the followings functions for changing the checkpoint period,
(a) The checkpoint period setting unit 6 can change within a predetermined range which is comprised of a lower limit value and an upper limit value. In this case, the predetermined range may include at least one limit value.
(b) An initial value for the checkpoint period is defined as the lower limit value or the upper limit value, and the checkpoint period setting unit 6 begins to change the checkpoint period.

Next, a second embodiment of the present invention will be described.

Figure 9:
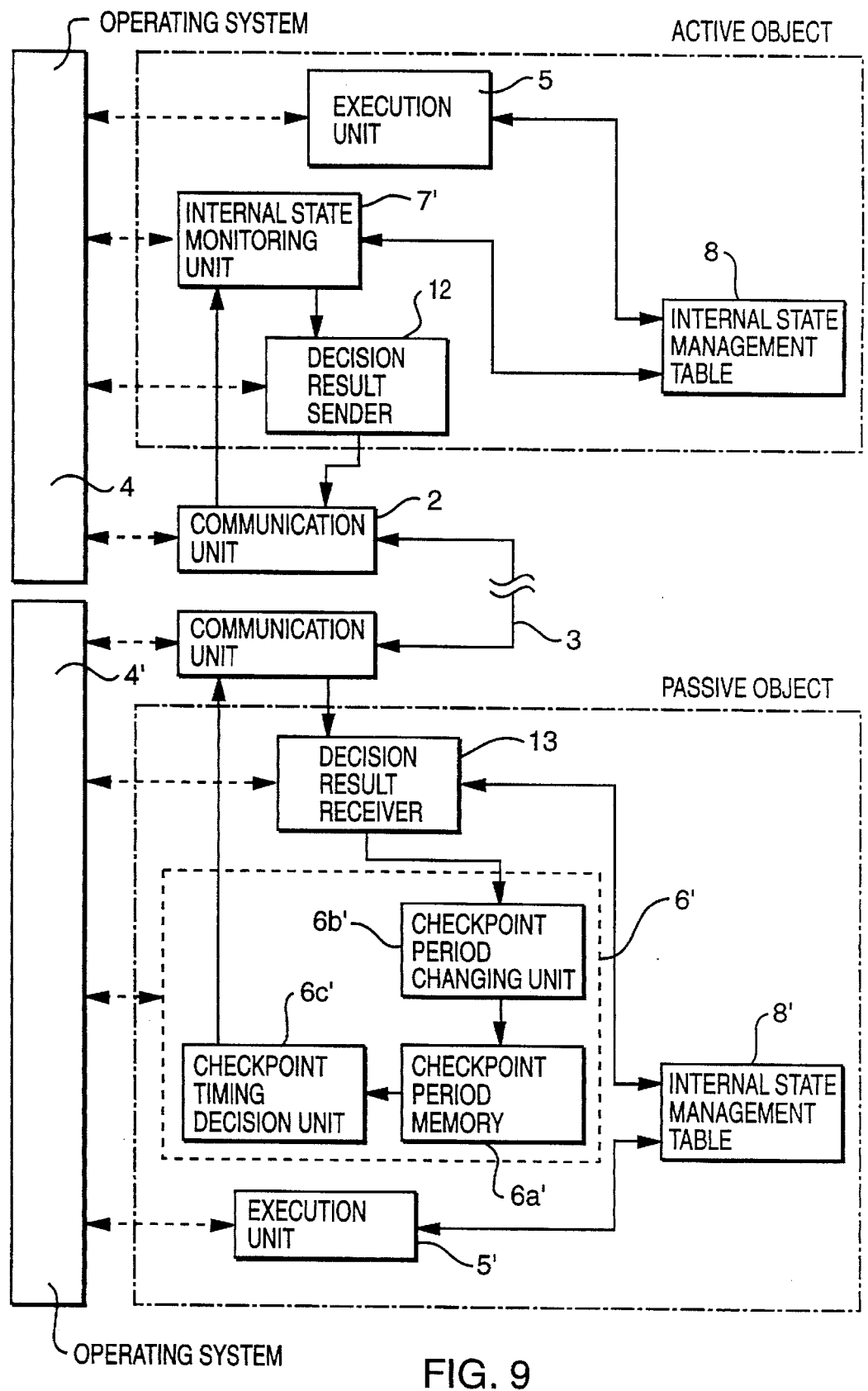
FIG. 9 is a block diagram showing a stand-by system according to a second embodiment of the present invention.

FIG. 9 shows a stand-by system of a second embodiment of the invention, with a mechanism to dynamically change the checkpoint period. In the second embodiment, the stand-by system type is the passive object oriented method, i.e., the function to manage the checkpoint period exists in the passive object.

As shown in FIG. 9, the operating system 4 controls the execution of program modules and communication among the processing units 1a, 1b, 1c. The execution unit 5 carries out the inherent operation related to its own program module under the control of the operating system 4.

In the passive object, a checkpoint period setting unit 6' comprises a checkpoint period memory 6a', a checkpoint period changing unit 6b', and a checkpoint timing decision unit 6c'. The checkpoint period memory 6a' stores a checkpoint period as representing the interval time between the checkpoints. The checkpoint period changing unit 6b' controls the checkpoint period stored in the checkpoint period memory 6a' by setting the current value to a predetermined value or changing the current value by a predetermined method. The checkpoint timing decision unit 6c' counts time by a built-in clock function and checks whether or not an elapsed time exceeds the checkpoint period stored in the checkpoint period memory 6a'. When the elapsed time equals the checkpoint period, the checkpoint timing decision unit 6c' sends an inquiry request message to the corresponding active object. The inquiry request message is a signal to activate an internal state monitoring unit 7' in the active object. Sending the message can be easily communicated using a system call prepared in the operating systems 4.

In the second embodiment, when the stand-by system comprises the passive object(s), the operating system 4 activates the checkpoint period setting unit 6' after the passive object has been registered into the processing unit 1.

The internal state monitoring unit 7' in the active object checks whether or not the internal state in the execution unit 5 has been changed. That is, the internal state monitoring unit 7' is activated by the checkpoint timing decision unit 6c' in the passive object through the operating system 4, when the time counted by the checkpoint timing decision unit 6c' has exceeded the checkpoint period. Then the internal state monitoring unit 7' checks whether or not the internal state of the active object has been changed during an interval from the last checkpoint to the present checkpoint. The internal state monitoring unit 7' refers to the internal state management table 8 in order to check whether or not the internal state of program module has been changed.

After the internal state monitoring unit 7' checks whether or not the internal state of program module has been changed, it activates a decision result sender 12 in order to send a decision result.

More particularly, when the internal state monitoring unit 7' detects that the internal state of the active object has been changed at the present checkpoint, it activates the decision result sender 12. The decision result sender 12 sends the decision result including the internal state of the active object to a decision result receiver 13 of the corresponding passive object(s).

Conversely, when the internal state monitoring unit 7' detects that the internal state of the active object has not been changed, the decision result sender 12 sends a decision result to the decision result receiver 13 of the corresponding passive object (s). The decision result does not include the internal state.

In the passive object, the decision result receiver 13 receives the decision result, and operates as followings according to the received decision result. That is, when the decision result includes the internal state of the active object, the decision result receiver 13 updates the internal state of the passive object according to the received internal state. When the received decision result does not include the internal state, the decision result receiver 13 activates the checkpoint period changing unit to increase the present checkpoint period. A way to change the checkpoint period is the same as the first embodiment.

Although, in FIG. 9, the active object and the passive object are under control of separated operating systems 4 and 4', both the active object and the passive object may be under control of one operating system.

The stand-by system constructed as stated above is operated as follows.

Figure 10A:
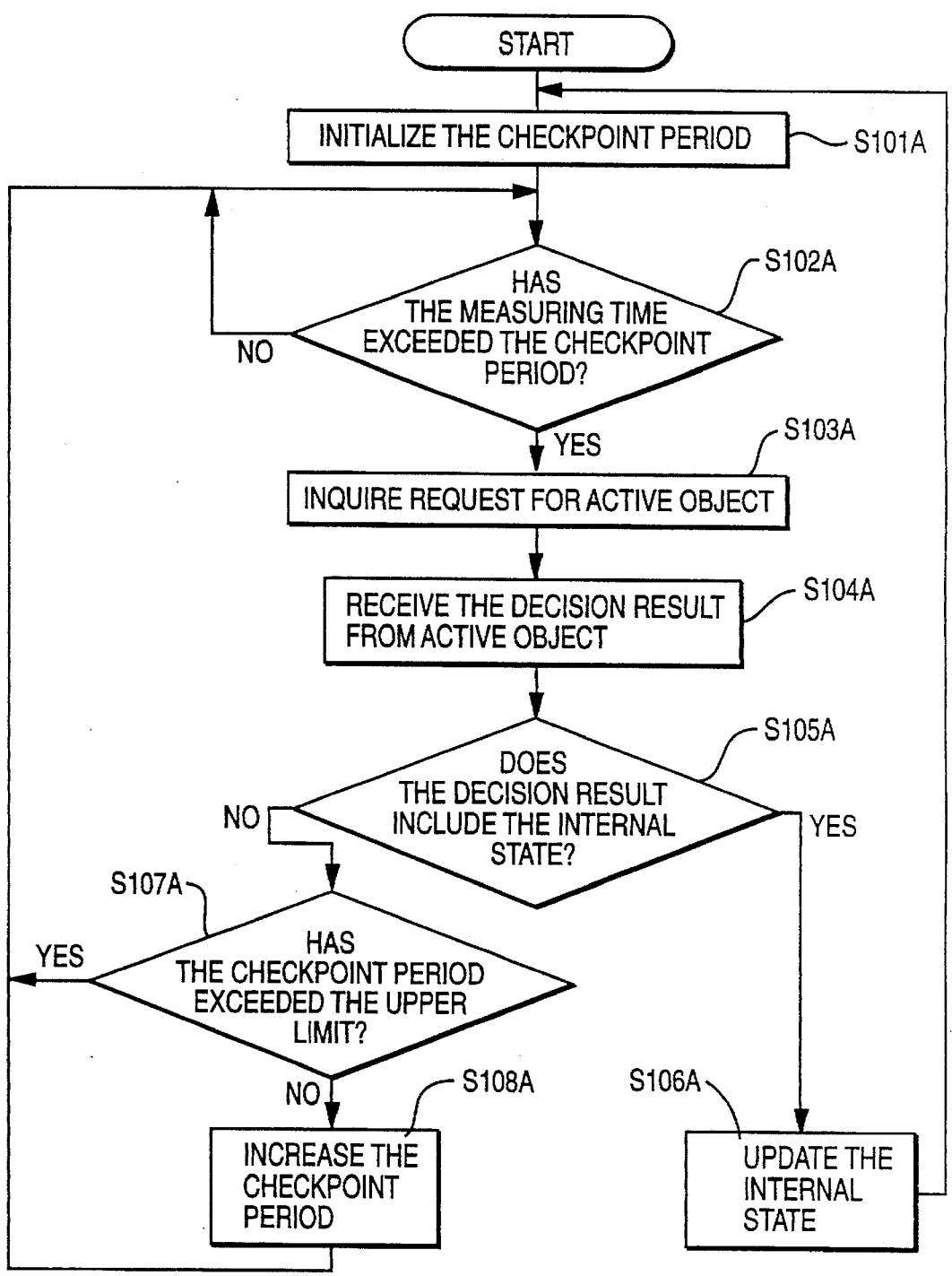
FIGS. 10A and 10B are flow diagrams for illustrating the operation of the stand-by system of FIG. 9.
Figure 10B:
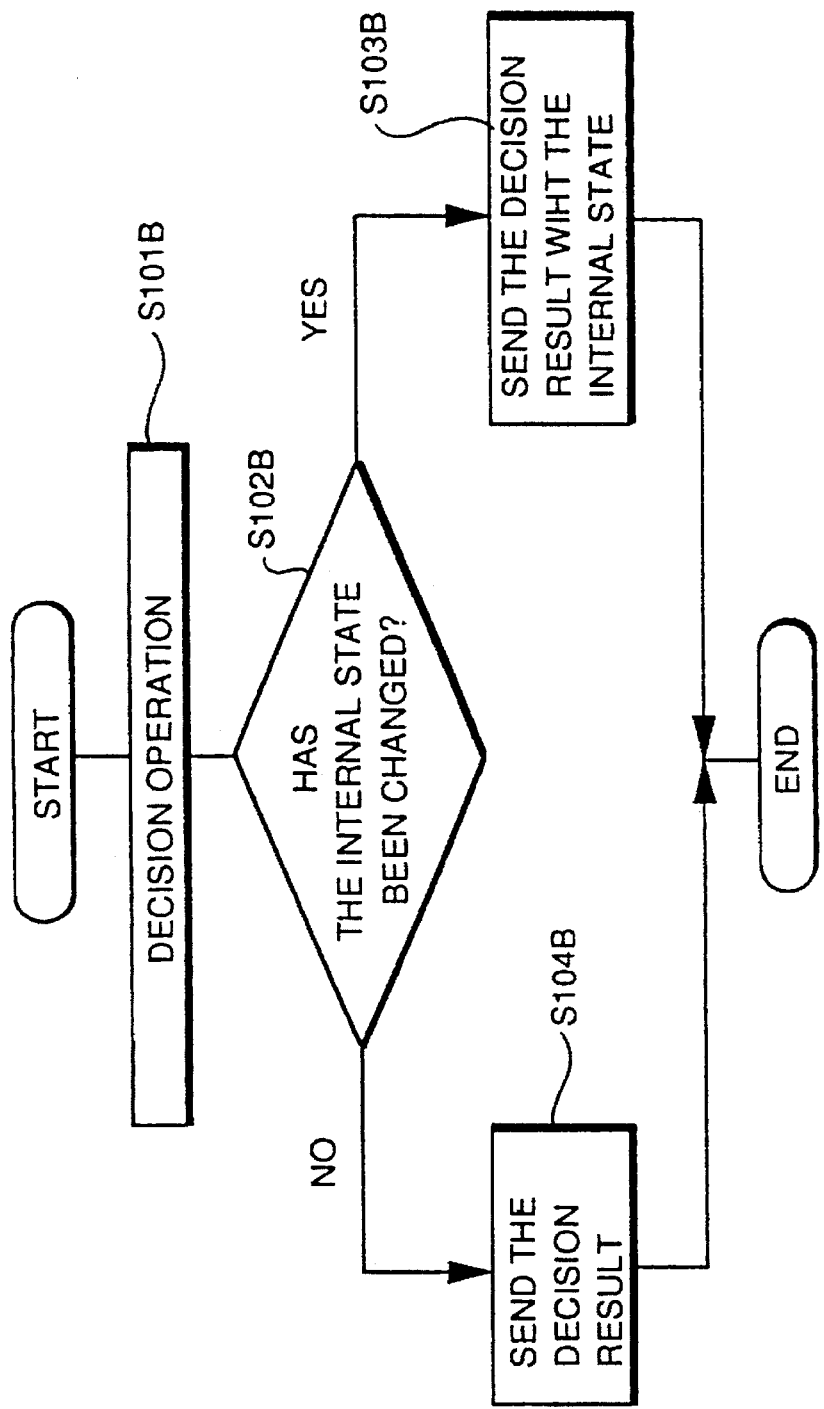

FIGS. 10A and 10B are flow diagrams for illustrating the operation of the stand-by system of FIG. 9. FIG. 10A shows a flow diagram for illustrating the operation at the passive object, and FIG. 10B shows a flow diagram illustrating the operation at the active object.

First, when the operating system 4' registers a program module as the passive object, the operating system 4' activates the checkpoint period setting unit 6', and sets a predetermined initial value as the checkpoint period (STEP 101A). The checkpoint period setting unit 6', for example, is given 10 ms as an initial value. The checkpoint period setting unit 6' counts whether or not the elapsed time exceeds the checkpoint period (STEP 102A). When the checkpoint period checking unit 6' detects that the elapsed time has been exceeded, the checkpoint period checking unit 6' activates the internal state monitoring unit 7' in the corresponding active object throughout the communication unit 2, 2' and the communication line 3 (STEP 103A).

In the active object, the internal state monitoring unit 7' checks whether or not the internal state has been changed from a last checkpoint to a present checkpoint (STEP S101B).

When the internal state monitoring unit 7' detects that the internal state has been changed(STEP 102B), the internal state monitoring unit 7' activates the decision result sender 12 to send the decision result including the internal state to the decision result receiver 13 of the corresponding passive object (STEP 103B).

When the internal state monitoring unit 7' detects that the internal state has not been changed (STEP 102B), the internal state monitoring unit 7' activates the decision result sender 12 to send the decision result without the internal state to the decision result receiver 13 of the corresponding passive object (STEP 104B).

In the passive object, the decision result receiver 13 receives the decision result (STEP 104A), and the decision result receiver 13 detects whether or not the decision result includes the internal state (STEP 105A). The passive object can recognize according to the received decision result whether or not the internal state has been changed. That is, when the received decision result includes the internal state, the decision result receiver 13 updates the content of the internal state held in the internal state management table 8' to the content of the received internal state (STEP 106A). After updating the internal state, the process returns to STEP 101A, the checkpoint period setting unit 6' resets the present checkpoint period to the initial value, and the above flow is repeated.

In STEP 105A, when the decision result does not include the internal state, the decision result receiver 13 activates the checkpoint period setting unit 6'. The checkpoint period setting unit 6' checks whether or not the checkpoint period has exceeded an upper limit (STEP 107A). When the checkpoint period has not exceeded the upper limit, it increases the present checkpoint period (STEP 108A), the process returns to STEP 102A, and the above flow is repeated. When the checkpoint period has been exceeded, the checkpoint period setting unit 6' does not change the checkpoint period, and the process proceeds to STEP 102A to repeat the process as discussed above.

Considering the operation as described above, for example, with respect to the program module A, the passive object A2 and A3 respectively measure the elapsed time, and detect whether or not the elapsed time has exceeded the stored checkpoint period. When the elapsed time has exceeded the stored checkpoint period, its passive object A2(A3) sends the inquiry request message to the active object A1. The active object A1 receives the inquiry request message, and checks whether or not its own internal state has changed. When its internal state has changed; the active object A1 broadcasts the decision result including its own internal state to the passive objects A2 and A3. Conversely, when its internal state has not been changed, the active object A1 broadcasts the decision result without its own internal state to the passive objects A2 and A3. The passive objects A2 and A3 check whether or not the received decision result includes the internal state. When the received decision result does not include the internal state; each of the passive objects A2 and A3 checks whether or not each of them can increase the checkpoint period, and increase their checkpoint period. When the received decision result includes the internal state, the passive objects A2 and A3 will updates its own internal state according to the received internal state.

In this case, the following two types of methods can be used to send the decision result from the active object to the passive object. In one type, whenever the active object receives a request message from each passive object, it replies the decision result to each passive object. In the other type, when the active object receives request messages from all of the passive objects, it replies the decision result only once to all passive objects.

According to the second embodiment, the stand-by system does not interrupt the operation to be executed by the privileged program modules, i.e., the active object, because each of the other program modules without an execution privilege manages the checkpoint period.

When the execution unit 5 in the active object does not execute so that its own internal state does not change, the checkpoint period setting unit 6' increases the checkpoint period. Then the stand-by system can decrease the frequency of checkpoints for maintaining the consistency of the internal state between the active object and the passive object(s). Therefore, the stand-by system can reduce the extra overhead for maintaining the consistency of internal state between the active object and the passive object(s). Consequently, other program modules registered in the same processing unit 1 can have greater execution time in the CPU.

In the case that the execution unit 5 is passive for an extended period so that the checkpoint period becomes to be long enough, and the execution unit 5 restarts, when the internal state has been changed, the checkpoint period setting unit 6 resets the present checkpoint period to the initial value. Consequently, the time for rollforward operation to take over the active object operation in case of its failure would not be undesirably long.

When the execution unit 5 does not execute for a very long time, the checkpoint period setting unit 6' may hold a long checkpoint period. In this case, when the active object restarts and fails just before the next checkpoint timing, the rollforward operation may be too long. To meet this contingency, the stand-by system can have an upper limit of the checkpoint period to avoid an excessively long rollforward operation.

In the above discuss, the invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, the program modules in each processing unit 1 may be operated concurrently. That is, the operating system 4 controls that the checkpoint period checking unit 6 activates concurrently with executing the execution unit 5.

It is possible to be realized by various modifications to the second embodiment of the invention. The following are modifications to how to change the checkpoint period.

(a) Upon detecting that the internal state has been changed, the checkpoint period setting unit 6' decreases the present checkpoint period. Conversely, upon detecting that the internal state has not been changed, the checkpoint period setting unit 6' resets the present checkpoint period to the initial value.

(b) Upon detecting that the internal state has been changed, the checkpoint period setting unit decreases the present checkpoint period. Conversely, upon detecting that the internal state has not been changed, the checkpoint period setting unit 6' increases the present checkpoint period.

(c) The checkpoint period setting unit 6' can change within a predetermined range which is comprised of a lower limit value and an upper limit value. In this case, the predetermined range may be one limit value.

(d) An initial value for the checkpoint period is defined as the lower limit value or the upper limit value, and the checkpoint period setting unit 6' begins to change the checkpoint period.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claim and their equivalents.

In view of the above description, the embodiments of the present invention are directed to a stand-by system based on program modules replication that can avoid performing unnecessary checkpoint operations, which copies the internal state of an active object to a passive object to guarantee to maintain the consistency between them, by monitoring the internal state of program modules at an efficient checkpoint period.

According by, the various embodiments of the invention may include the following features.

The stand-by system monitors whether or not the internal state of the program module has been changed at every checkpoint. When it detects that the internal state has been changed, it takes actions to maintain the consistency of the internal state between its own program module, i.e., an active object, and the other program module, i.e., a passive object. Conversely, when it detects that the internal state has not been changed, it acts to modify the checkpoint interval. Therefore, the stand-by system can efficiently monitor the internal state by dynamically changing the checkpoint period. Hence, the stand-by system can reduce the extra overhead for maintaining consistency of the internal state between an active object and a passive object.

More particularly, the stand-by system monitors whether or not the internal state of program modules has been changed at every checkpoint. When it detects that the internal state has been changed, it acts to maintain consistency of the internal state between its program module and replicated other plurality of program modules, and decreases the checkpoint period. The stand-by system can avoid excessively increasing the checkpoint period.

Conversely, when the stand-by system detects that the internal state has not been changed, it increases the checkpoint period. That is, the stand-by system can increase the checkpoint period for maintaining the consistency of internal state between then.

Thus, the stand-by system can reduce the extra overhead for maintaining consistency of internal state between an active object and a passive object.

In a program module given an execution privilege, when the program module detects that the internal state has been changed, the privileged program module sends its own internal state to the corresponding other replicated program module(s). As a result, each replicated program module changes its own internal state to the internal state sent from the privileged program module. Therefore, the stand-by system can maintain the consistency of the internal state between replicated program modules.

At this time, when the privileged program module detects that the internal state has not been changed, it increases its own checkpoint period to decrease the frequency of checkpoints for maintaining the consistency of the internal state between modules. Conversely, when the privileged program module detects that the internal state has been changed, it copies its own internal state to the replicated program modules in order to maintain the consistency of the internal state, and it decreases the checkpoint period. Accordingly, the stand-by system can avoid the checkpoint period being too long.

Thus, the stand-by system can reduce the extra overhead for maintaining consistency of the internal state between an active object and a passive object.

In accordance with another embodiment, a program module given an execution privilege monitors whether or not its own internal state has been changed whenever it receives an inquiry request message sent from its corresponding other program module not given an execution privilege. Then it replies a decision result to each of the other program modules. Next, each of the other program modules receiving the decision result checks whether or not the received decision result includes the internal state of the privileged program module.

If each of the other program modules detects that the received decision result does not include the internal state, then it increases its own checkpoint period. The stand-by system can decrease the frequency of checkpoints for maintaining the consistency of the internal state between an active object and a passive object.

As a result, the stand-by system can reduce the extra overhead for maintaining the consistency of the internal state between the active object and the passive object.

When the receiving decision result includes the internal state, each of the other program modules maintains the consistency of the internal state between them by altering its own internal state according to the received decision result. At the time when the replicated program modules receive the internal state from the privileged program module in order to maintain the consistency of the internal state, such program modules decrease the checkpoint period. Therefore, the stand-by system can avoid increasing the checkpoint period to be too long at times when the internal state of the privileged program module is changing.

Further, the stand-by system does not interrupt the operation to be executed by the privileged program modules, because each of the other program modules without an execution privilege manages the checkpoint period.

What is claimed is:

1. A stand-by system for a process including a process module replicated to at least two process modules, wherein one of the process modules is a privileged process module having an execution privilege, the execution privilege being transferred to another one of the process modules upon occurrence of a process fault in the privileged module, the stand-by system comprising:

a checkpoint period memory for storing a checkpoint period representing a time interval value between consecutive checkpoints of a succession of checkpoints;

checking means for checking whether an internal state of the privileged process module has been changed during each said checkpoint period and for providing a checking result;

checkpoint period changing means for changing the time interval value of the checkpoint period stored in said checkpoint period memory based on the checking result; and consistency maintaining means for maintaining consistency of the internal states of the privileged process module and the another one of process modules based on the checking result.

2. A stand-by system for a processor including a process module replicated to at least two process modules, wherein one of the process modules is a privileged process module having an execution privilege, the execution privilege being transferred to another one of the process modules upon occurrence of a process fault in the privileged module, the stand-by system comprising:

a checkpoint period memory for storing a checkpoint period representing a time interval value between consecutive checkpoints of a succession of checkpoints;

checkpoint period changing means for changing the time interval value of the checkpoint period stored in said checkpoint period memory;

checking means for checking whether an internal state of the privileged process module has been changed during each said checkpoint period;

consistency maintaining means for maintaining consistency of the internal states of the privileged process module and another one of process modules based on a checking result indicated by said checking means; and wherein said checking means including first means for causing said checkpoint period changing means to change the time interval value of the checkpoint period when the checking result indicates that the internal state of the privileged process module has not been changed, and second means for causing said consistency maintaining means to maintain the consistency of the internal states when the checking result indicates that the internal state of the privileged process module has been changed.

3. A stand-by system according to claim 2, wherein said second means includes means for causing said checkpoint period changing means to change the time interval value of the checkpoint period.

4. A stand-by system according to claim 2, wherein said second means includes means for causing said checkpoint period changing means to change a present time interval value of the checkpoint period to a pre-selected initial time interval value.

5. A stand-by system according to claim 2, wherein said first means includes means for causing said checkpoint period changing means to increase the time interval value of the checkpoint period; and said second means includes means to cause said checkpoint period changing means to change the time interval value of the checkpoint period to a pre-selected initial time interval value.

6. A stand-by system according to claim 2, wherein said first means includes means for causing said checkpoint period changing means to change the time interval value of the checkpoint period to a pre-selected initial time interval value; and said second means includes means for causing said checkpoint period changing means to decrease the time interval value of the checkpoint period.

7. A stand-by system according to claim 2, wherein said first means includes means for causing said checkpoint period changing means to increase the time interval value of the checkpoint period; and said second means includes a means to cause said checkpoint period changing means to decrease the time interval value of the checkpoint period.

8. A stand-by system according to claim 3, 4, 5, 6 or 7, wherein said checkpoint period changing means changes the time interval value of the checkpoint period within a predetermined range.

9. A stand-by system according to claim 1 or 2, wherein said consistency maintaining means copies a changed portion of the internal state in the privileged process module to a corresponding portion of the internal state in the another one of the process modules.

10. A stand-by system for a processor including a process module replicated to at least two process modules, said system comprising:

a privileged process module having an execution privilege;

a non-privileged process module, the execution privilege being transferred to the non-privileged process module upon occurrence of a process fault in the privileged process module;

said privileged process module comprising:

a checkpoint period memory for storing a checkpoint period representing a time interval value between consecutive checkpoints of a succession of checkpoints;

checkpoint period changing means for changing the time interval value of the checkpoint period stored in said checkpoint period memory;

sending means for sending an internal state of the privileged process module to the non-privileged process module; and checking means for checking whether the internal state of the privileged process module has been changed during each said checkpoint period, wherein said checking means includes first means for causing said checkpoint period changing means to change the time interval value of the checkpoint period when said checking means determines that the internal state of the privileged process module has not been changed during a checkpoint period and second means for causing said sending means to change the checkpoint period when said checking means determines that the internal state of the privileged process module has been changed;

said non-privileged process module comprising:

an internal state memory for storing an internal state of the non-privileged process module; and internal state changing means for changing the internal state stored in said internal state memory according to the internal state sent by said sending means.

11. A stand-by system for a processor including a process module replicated to at least two process modules, said system comprising:

a privileged process module having an execution privilege;

a non-privileged process module, the execution privilege being transferred to the non-privileged process module upon occurrence of a process fault in the privileged module;

said privileged process module comprising:

means for checking whether the internal state of the privileged module has changed in response to an inquiry request message from the non-privileged process module; and sending means for sending a checking result indicated by said checking means to the non-privileged process module;

said non-privileged process module comprising:

a checkpoint period memory for storing a checkpoint period representing a time interval value between consecutive checkpoints of a succession of checkpoints;

checkpoint period changing means for changing the time interval value of the checkpoint period stored in said checkpoint period memory;

an internal state memory for storing an internal state of the non-privileged process module;

internal state changing means for changing the internal state stored in said internal state memory;

inquiry request message sending means for sending the inquiry request message to said checking means at each said checkpoint, the inquiry request message inquiring whether the internal state of the privileged process module has been changed during each checkpoint period;

first means for causing said checkpoint period changing means to change the time interval value of the checkpoint period when the checking result sent from said sending means does not include a changed internal state of the privileged process module; and second means for causing said internal state changing means to change the internal state of the non-privileged process module to be consistent with the changed internal state of the privileged process module included with the checking result sent from said sending means.

12. A stand-by system according to claims 10 or 11, wherein said second means includes means for causing said checkpoint period changing means to change said checkpoint period.

13. A stand-by system according to claims 10 or 11, wherein said second means includes means for causing said checkpoint period changing means to change the checkpoint period to a pre-selected initial time interval value.

14. A stand-by system according to claims 10 or 11, wherein said first means includes means for causing said checkpoint period changing means to increase the time interval value of the checkpoint period; and said second means includes means for causing said checkpoint period changing means to change the checkpoint period to a pre-selected initial time interval value.

15. A stand-by system according to claims 10 or 11, wherein said first means includes means for causing said checkpoint period changing means to change the checkpoint period to a pre-selected initial time interval value; and said second means includes means for causing said checkpoint period changing means to decrease the time interval value of the checkpoint period.

16. A stand-by system according to claims 10 or 11, wherein said first means includes means for causing said checkpoint period changing means to increase the time interval value of the checkpoint period; and said second means includes means for causing said checkpoint period changing means to decrease the time interval value of the checkpoint period.

17. A method for changing a checkpoint period in a stand-by system for a processor, the stand-by system including a process module replicated to at least two process modules, wherein one of the process modules is a privileged process module having an execution privilege, the execution privilege being transferred to a non-privileged one of the process modules upon occurrence of a process fault in the privileged process module, the method comprising the steps of:

checking whether an internal state of the privileged process module has been changed at each of a succession of checkpoints having a checkpoint period representing a time interval value;

sending the internal state of the privileged process module to the non-privileged process module each time the internal state of the privileged process module has been changed during a checkpoint period;

changing the time interval value of the checkpoint period upon detecting that the internal state of the privileged process module has not been changed; and changing the internal state of the non-privileged process module according to the changed internal state sent in said sending step.

18. A method for changing a checkpoint period in a stand-by system for a processor, the stand-by system including a process module replicated to at least two process modules, wherein one of the process modules is a privileged module having an execution privilege, the execution privilege being transferred to a non-privileged one of the process modules upon occurrence of a process fault in the privileged process module, the method comprising the steps of:

sending an inquiry request message from the non-privileged process module to the privileged process module at each of a succession of checkpoints having a checkpoint period representing a time interval value, the inquiry request message inquiring whether the internal state of the privileged process module has been changed during each checkpoint period;

checking whether the internal state of the privileged process module has been changed in response to the inquiry request message sent from the non-privileged process module;

sending a result of said checking step to the non-privileged process module;

changing the time interval value of the checkpoint period when the result of said checking step sent to said non-privileged process module does not include the internal state of the privileged process module; and changing an internal state of the non-privileged process module when the result of said checking step sent to the non-privileged process module includes the internal state of the privileged process module.

19. A method for changing a checkpoint period in a stand-by system according to claims 17 or 18, wherein said internal state changing step includes a step of changing the time interval value of the checkpoint period.

20. A method for changing a checkpoint period in a stand-by system according to claims 17 or 18, wherein said internal state changing step includes a step of resetting the checkpoint period to a pre-selected initial time interval value.

21. A method for changing a checkpoint period in a stand-by system according to claims 17 or 18, wherein said checkpoint period changing step includes a step of increasing the time interval value of the checkpoint period; and said internal state changing step includes a step of resetting the checkpoint period to a pre-selected initial time interval value.

22. A method for changing a checkpoint period in a stand-by system according to claims 17 or 18, wherein said checkpoint period changing step includes a step of resetting the checkpoint period to a pre-selected initial time interval value; and said internal state changing step includes a step of decreasing the time interval value of the checkpoint period.

23. A method for changing a checkpoint period in a stand-by system according to claims 17 or 18, wherein said checkpoint period changing step includes a step of increasing time interval value of the checkpoint period; and said internal state changing step includes a step of decreasing the time interval value of the checkpoint period.

24. A method for changing a checkpoint period in a stand-by system for a processor, the stand-by system including a process module replicated to at least two process modules, wherein one of the process modules is a privileged process module having an execution privilege, the execution privilege being transferred to a non-privileged other one of the process modules upon occurrence of a process fault in the privileged process module, the method comprising the steps of:

checking whether an internal state of the privileged process module has changed at each of a succession of checkpoints having a checkpoint period representing a time interval value and providing a checking result;

changing the time interval value of the checkpoint period based on the checking result; and maintaining consistency of the internal states of the privileged process module and the non-privileged other one of the process modules based on the checking result.

25. A method for changing a checkpoint period in a stand-by system for a processor, the stand-by system including a process module replicated to at least two process modules, wherein one of the process modules is a privileged process module having an execution privilege, the execution privilege being transferred to a non-privileged other one of the process modules upon occurrence of a process fault in the privileged process module, the method comprising the steps of:

checking whether an internal state of the privileged process module has changed during each said checkpoint period and providing a checking result;

maintaining consistency of the internal states of the privileged process module and the non-privileged other one of the process modules based on the checking result; and wherein said checking step includes a first step for causing said checkpoint period changing step to change the time interval value of the checkpoint period when the checking result indicates that the internal state of the privileged process module has not changed, and a second step for causing said maintaining step to maintain the consistency of the internal states when the checking result indicates that the internal state of the privileged process module has changed.

26. The method according to claim 25, wherein said second step includes changing the time interval value of the checkpoint period.

27. The method according to claim 25, wherein said second step includes changing a present time interval value of the checkpoint period to pre-selected initial time interval value.

28. The method according to claim 25, wherein said first step increases the time interval value of a present checkpoint period; and said second step includes changing the time interval value of the present checkpoint period to a pre-selected initial time interval value.

29. The method according to claim 25, wherein said first step changes the time interval value of the present checkpoint period to a pre-selected initial time interval value; and said second step includes decreasing the time interval value of the present checkpoint period.

30. The method according to claim 25, wherein said first step increases the time interval value of a present checkpoint period; and said second step includes decreasing the time interval value of the present checkpoint period.

31. The method according to claims 26, 27, 28, 29, or 30, wherein said changing step changes the time interval value of the checkpoint period within a predetermined range.

32. The method according to claims 24 or 25, wherein said maintaining step copies a changed portion of the internal state of the privileged process module to a corresponding portion of the internal state of the non-privileged other one of the process modules.

* * * * *